(12) United States Patent
Liu et al.

(10) Patent No.: US 12,228,773 B1
(45) Date of Patent: Feb. 18, 2025

(54) FIBER OPTIC CONNECTOR AND METHOD OF ASSEMBLING THE SAME

(71) Applicant: CommScope Telecommunications (Shanghai) Co. Ltd., Shanghai (CN)

(72) Inventors: Lei Liu, Shanghai (CN); Zhaoyang Tong, Shanghai (CN)

(73) Assignee: COMMSCOPE TELECOMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/934,088

(22) Filed: Sep. 21, 2022

Related U.S. Application Data

(63) Continuation of application No. 16/883,229, filed on May 26, 2020, now Pat. No. 11,474,306, which is a (Continued)

(30) Foreign Application Priority Data

Feb. 14, 2014 (CN) .......................... 201410052557.X

(51) Int. Cl.
G02B 6/38 (2006.01)
(52) U.S. Cl.
CPC ......... *G02B 6/3869* (2013.01); *G02B 6/3821* (2013.01); *G02B 6/3888* (2021.05); *G02B 6/3849* (2013.01)
(58) Field of Classification Search
CPC .. G02B 6/3821; G02B 6/3849; G02B 6/3847; G02B 6/3888
See application file for complete search history.

(56) References Cited

U.S. PATENT DOCUMENTS

| 4,201,444 A | 5/1980 | McCartney et al. |
| 4,217,030 A | 8/1980 | Howarth |

(Continued)

FOREIGN PATENT DOCUMENTS

| CH | 681393 A5 * | 3/1993 | ........... G02B 6/3821 |
| CN | 1175002 A | 3/1998 | |

(Continued)

OTHER PUBLICATIONS

CH 681393 A5 (English Translation) (Year: 1993).*

(Continued)

*Primary Examiner* — Balram T Parbadia
*Assistant Examiner* — Mary A El-Shammaa
(74) *Attorney, Agent, or Firm* — Merchant & Gould P.C.

(57) ABSTRACT

The present invention discloses a fiber optic connector comprising a housing, a spring, a ferrule assembly and a crimping seat. Before being inserted into the housing, the ferrule assembly is pre-assembled into the crimping seat in a manner of being movable relative to the crimping seat. The spring is pre-assembled into the housing before the ferrule assembly is inserted into the housing. After the pre-assembled ferrule assembly and crimping seat are inserted into the housing, the crimping seat is snap-fitted in the housing, and the spring pushes the ferrule assembly, so that the ferrule assembly is capable of being moved against the spring relative to the crimping seat. Before inserted into a housing of the fiber optic connector, some components may be pre-assembled together to form an integral assembly having a size less than that of a housing of the fiber optic connector. Accordingly, the integral assembly may be smoothly pulled through a small long pipe. After pulled through the pipe, the integral assembly may be easily and quickly inserted into the housing as a whole at one time.

15 Claims, 3 Drawing Sheets

Related U.S. Application Data continuation of application No. 15/724,782, filed on Oct. 4, 2017, now Pat. No. 10,698,166, which is a continuation of application No. 15/118,926, filed as application No. PCT/IB2015/050980 on Feb. 10, 2015, now Pat. No. 9,829,649.

(56) References Cited

U.S. PATENT DOCUMENTS

| | | |
|---|---|---|
| 4,268,115 A | 5/1981 | Slemon et al. |
| 4,327,964 A | 5/1982 | Haesly et al. |
| 4,635,875 A | 1/1987 | Apple |
| 4,691,988 A | 9/1987 | Tremblay et al. |
| 4,715,675 A | 12/1987 | Kevern et al. |
| 4,762,389 A | 8/1988 | Kaihara |
| 4,787,699 A | 11/1988 | Moulin |
| 5,076,656 A | 12/1991 | Briggs et al. |
| 5,212,752 A | 5/1993 | Stephenson et al. |
| 5,216,733 A | 6/1993 | Nagase et al. |
| 5,231,685 A | 7/1993 | Hanzawa et al. |
| 5,245,683 A | 9/1993 | Belenkiy et al. |
| 5,253,315 A * | 10/1993 | Fentress .............. G02B 6/3888 385/76 |
| 5,261,019 A | 11/1993 | Beard et al. |
| 5,287,425 A | 2/1994 | Chang |
| 5,452,386 A | 9/1995 | Van Woesik |
| 5,465,313 A | 11/1995 | Belenkiy et al. |
| 5,471,713 A | 12/1995 | Alter et al. |
| 5,524,159 A | 6/1996 | Turgeon et al. |
| 5,619,610 A | 4/1997 | King et al. |
| 5,637,010 A | 6/1997 | Jost et al. |
| 5,640,476 A | 6/1997 | Womack et al. |
| 5,682,541 A | 10/1997 | Lee et al. |
| 5,809,192 A | 9/1998 | Manning et al. |
| 5,862,289 A | 1/1999 | Walter et al. |
| 5,863,083 A | 1/1999 | Giebel et al. |
| 5,897,393 A | 4/1999 | Haftmann |
| 5,898,808 A | 4/1999 | Morlion et al. |
| 5,915,058 A | 6/1999 | Clairardin et al. |
| 5,946,435 A | 8/1999 | Zheng et al. |
| 5,946,436 A | 8/1999 | Takashi |
| 5,953,475 A | 9/1999 | Beier et al. |
| 6,019,520 A | 2/2000 | Lin et al. |
| 6,079,881 A | 6/2000 | Roth |
| 6,081,647 A | 6/2000 | Roth et al. |
| 6,151,432 A | 11/2000 | Nakajima et al. |
| 6,154,597 A | 11/2000 | Roth |
| 6,245,999 B1 | 6/2001 | Costigan et al. |
| 6,287,018 B1 | 9/2001 | Andrews et al. |
| 6,296,399 B1 | 10/2001 | Halbach et al. |
| 6,325,547 B1 | 12/2001 | Cammons et al. |
| 6,396,993 B1 | 5/2002 | Giebel et al. |
| 6,398,422 B1 | 6/2002 | Szilagyi et al. |
| 6,419,399 B1 | 7/2002 | Loder et al. |
| 6,428,215 B1 | 8/2002 | Nault |
| 6,429,373 B1 | 8/2002 | Scrimpshire et al. |
| 6,540,410 B2 | 4/2003 | Childers et al. |
| 6,550,978 B2 | 4/2003 | De Marchi |
| 6,579,014 B2 | 6/2003 | Melton et al. |
| 6,648,520 B2 | 11/2003 | McDonald et al. |
| 6,672,774 B2 | 1/2004 | Theuerkorn et al. |
| 6,695,489 B2 | 2/2004 | Nault |
| 6,811,321 B1 | 11/2004 | Schmalzigaug et al. |
| 6,899,467 B2 | 5/2005 | McDonald et al. |
| 6,902,140 B1 | 6/2005 | Huang |
| 6,913,392 B2 | 7/2005 | Grzegorzewska et al. |
| 6,935,789 B2 | 8/2005 | Gross, III et al. |
| 6,945,704 B2 | 9/2005 | Yamaguchi |
| 6,960,025 B2 | 11/2005 | Gurreri |
| 7,090,406 B2 | 8/2006 | Melton et al. |
| 7,147,384 B2 | 12/2006 | Hardcastle et al. |
| 7,198,409 B2 | 4/2007 | Smith et al. |
| 7,204,016 B2 | 4/2007 | Roth et al. |
| 7,204,644 B2 | 4/2007 | Barnes et al. |
| 7,226,215 B2 | 6/2007 | Bareel et al. |
| 7,281,859 B2 | 10/2007 | Mudd et al. |
| 7,344,317 B2 | 3/2008 | Krowiak et al. |
| 7,357,579 B2 | 4/2008 | Feldner |
| 7,369,738 B2 | 5/2008 | Larson et al. |
| 7,406,241 B1 | 7/2008 | Opaluch et al. |
| 7,510,335 B1 | 3/2009 | Su et al. |
| 7,530,745 B2 | 5/2009 | Holmquist |
| 7,572,065 B2 | 8/2009 | Lu et al. |
| 7,574,095 B2 * | 8/2009 | Lock .............. G02B 6/52 385/139 |
| 7,614,797 B2 * | 11/2009 | Lu .............. G02B 6/3869 385/94 |
| 7,614,799 B2 | 11/2009 | Bradley et al. |
| 7,676,132 B1 | 3/2010 | Mandry et al. |
| 7,712,974 B2 | 5/2010 | Yazaki et al. |
| 7,744,288 B2 | 6/2010 | Lu et al. |
| 7,775,726 B2 | 8/2010 | Pepin et al. |
| 7,785,015 B2 | 8/2010 | Melton et al. |
| 7,806,599 B2 | 10/2010 | Margolin et al. |
| 7,838,775 B2 | 11/2010 | Montena |
| 8,311,378 B2 | 11/2012 | Niiyama et al. |
| 8,391,664 B2 | 3/2013 | Kowalczyk et al. |
| 8,393,803 B2 | 3/2013 | Hogue |
| 8,439,577 B2 | 5/2013 | Jenkins |
| 8,443,488 B2 | 5/2013 | Zhang |
| 8,480,312 B2 | 7/2013 | Smith et al. |
| 8,548,293 B2 | 10/2013 | Kachmar |
| 8,577,199 B2 | 11/2013 | Pierce et al. |
| 8,647,140 B2 | 2/2014 | Annecke |
| 8,753,022 B2 | 6/2014 | Schroeder et al. |
| 8,821,180 B2 | 9/2014 | Blakborn et al. |
| 9,130,303 B2 | 9/2015 | Anderson et al. |
| 9,182,567 B2 | 11/2015 | Mullaney |
| 9,216,530 B2 | 12/2015 | Vaccaro |
| 9,229,173 B2 | 1/2016 | Yamauchi et al. |
| 9,239,441 B2 | 1/2016 | Melton et al. |
| 9,268,102 B2 | 2/2016 | Daems et al. |
| 9,285,559 B1 | 3/2016 | Stockton et al. |
| 9,297,976 B2 | 3/2016 | Hill et al. |
| 9,383,539 B2 | 7/2016 | Hill et al. |
| 9,417,403 B2 | 8/2016 | Mullaney et al. |
| 9,448,370 B2 | 9/2016 | Xue et al. |
| 9,470,847 B2 | 10/2016 | Grinderslev |
| 9,557,496 B2 | 1/2017 | Irwin et al. |
| 9,684,138 B2 | 6/2017 | Lu |
| 9,739,971 B2 | 8/2017 | Eberle, Jr. et al. |
| 9,804,342 B2 | 10/2017 | Little et al. |
| 9,829,649 B2 | 11/2017 | Liu et al. |
| 9,910,224 B2 | 3/2018 | Liu et al. |
| 9,939,591 B2 | 4/2018 | Mullaney et al. |
| 9,971,104 B2 | 5/2018 | Tong et al. |
| 10,018,797 B2 | 7/2018 | Cheng et al. |
| 10,067,301 B2 | 9/2018 | Murray et al. |
| 10,073,224 B2 | 9/2018 | Tong et al. |
| 10,215,930 B2 | 2/2019 | Mullaney et al. |
| 10,281,649 B2 | 5/2019 | Nhep et al. |
| 10,466,425 B2 | 11/2019 | Liu et al. |
| 10,473,867 B2 | 11/2019 | Tong et al. |
| 10,534,139 B2 | 1/2020 | Dong et al. |
| 10,591,678 B2 | 3/2020 | Mullaney et al. |
| 10,620,385 B2 | 4/2020 | Nhep et al. |
| 10,641,970 B2 | 5/2020 | Ott et al. |
| 10,698,166 B2 | 6/2020 | Liu et al. |
| 11,002,917 B2 | 5/2021 | Liu et al. |
| 11,372,172 B2 | 7/2022 | Mullaney et al. |
| 11,378,756 B2 | 7/2022 | Ott et al. |
| 11,409,051 B2 | 8/2022 | Nhep et al. |
| 11,474,306 B2 | 10/2022 | Liu et al. |
| 11,506,844 B2 | 11/2022 | Liu et al. |
| 11,726,270 B2 | 8/2023 | Tong et al. |
| 11,747,573 B2 | 9/2023 | Nhep et al. |
| 11,789,216 B2 | 10/2023 | Ott et al. |
| 11,880,074 B2 | 1/2024 | Mullaney et al. |
| 2001/0012428 A1 | 8/2001 | Nakajima et al. |
| 2001/0014197 A1 | 8/2001 | De Marchi |
| 2002/0076165 A1 | 6/2002 | Childers et al. |
| 2002/0106163 A1 | 8/2002 | Cairns |
| 2002/0139966 A1 | 10/2002 | Griffioen et al. |
| 2002/0186934 A1 | 12/2002 | Hug et al. |

(56) References Cited

U.S. PATENT DOCUMENTS

| | | |
|---|---|---|
| 2003/0063868 A1* | 4/2003 | Fentress .............. G02B 6/3869 385/60 |
| 2003/0077045 A1 | 4/2003 | Fleenor et al. |
| 2003/0215191 A1 | 11/2003 | Taira et al. |
| 2003/0231839 A1 | 12/2003 | Chen et al. |
| 2004/0023598 A1 | 2/2004 | Zimmel et al. |
| 2004/0076389 A1 | 4/2004 | Ozaki |
| 2004/0101254 A1 | 5/2004 | Erdman et al. |
| 2004/0105625 A1 | 6/2004 | Ueda et al. |
| 2004/0117981 A1* | 6/2004 | Roth .................. G02B 6/3849 29/748 |
| 2004/0165832 A1 | 8/2004 | Bates, III et al. |
| 2004/0223699 A1 | 11/2004 | Melton et al. |
| 2005/0084215 A1 | 4/2005 | Grzegorzewska et al. |
| 2005/0135755 A1 | 6/2005 | Kiani et al. |
| 2005/0244108 A1* | 11/2005 | Billman .............. G02B 6/3846 385/60 |
| 2006/0093300 A1 | 5/2006 | Marrs et al. |
| 2006/0115219 A1 | 6/2006 | Mudd et al. |
| 2007/0025665 A1 | 2/2007 | Dean, Jr. et al. |
| 2007/0036506 A1 | 2/2007 | Kewitsch |
| 2007/0172173 A1 | 7/2007 | Adomeit et al. |
| 2007/0263960 A1 | 11/2007 | Lock et al. |
| 2007/0284146 A1 | 12/2007 | Dower et al. |
| 2008/0011990 A1 | 1/2008 | Kostet et al. |
| 2008/0013891 A1 | 1/2008 | Nishioka et al. |
| 2008/0089650 A1 | 4/2008 | Legler et al. |
| 2008/0175540 A1* | 7/2008 | Zheng ................ G02B 6/3838 385/60 |
| 2008/0175545 A1* | 7/2008 | Zheng ................ G02B 6/3825 385/81 |
| 2008/0175546 A1 | 7/2008 | Lu et al. |
| 2008/0226234 A1 | 9/2008 | Droege |
| 2008/0226236 A1 | 9/2008 | Pepin et al. |
| 2008/0273855 A1 | 11/2008 | Bradley et al. |
| 2008/0317410 A1* | 12/2008 | Griffioen ................ G02B 6/52 385/54 |
| 2009/0148101 A1 | 6/2009 | Lu et al. |
| 2009/0148109 A1 | 6/2009 | Takahashi et al. |
| 2009/0185779 A1 | 7/2009 | Gurreri et al. |
| 2010/0202748 A1 | 8/2010 | Pierce et al. |
| 2010/0215321 A1* | 8/2010 | Jenkins ................ G02B 6/381 29/428 |
| 2010/0329627 A1* | 12/2010 | Donaldson .......... G02B 6/3888 29/857 |
| 2011/0002586 A1 | 1/2011 | Nhep |
| 2011/0097044 A1 | 4/2011 | Saito et al. |
| 2011/0170829 A1* | 7/2011 | Bradley .............. G02B 6/3849 29/874 |
| 2011/0176785 A1 | 7/2011 | Kowalczyk et al. |
| 2012/0027355 A1* | 2/2012 | LeBlanc ............. G02B 6/3879 385/76 |
| 2012/0170896 A1 | 7/2012 | Skluzacek et al. |
| 2012/0243831 A1 | 9/2012 | Chen |
| 2012/0257859 A1 | 10/2012 | Nhep |
| 2013/0058615 A1 | 3/2013 | Matthew et al. |
| 2013/0077928 A1 | 3/2013 | Hsing |
| 2013/0094828 A1 | 4/2013 | Loeffelholz et al. |
| 2013/0101258 A1 | 4/2013 | Hikosaka et al. |
| 2013/0177283 A1 | 7/2013 | Theuerkorn et al. |
| 2013/0216191 A1* | 8/2013 | Yamauchi ........... G02B 6/3624 385/84 |
| 2013/0322826 A1 | 12/2013 | Henke et al. |
| 2014/0023326 A1 | 1/2014 | Anderson et al. |
| 2014/0050446 A1 | 2/2014 | Chang et al. |
| 2014/0086534 A1 | 3/2014 | Lu et al. |
| 2014/0133806 A1* | 5/2014 | Hill .................... G02B 6/3821 385/77 |
| 2014/0133808 A1* | 5/2014 | Hill .................... G02B 6/3874 385/84 |
| 2014/0153878 A1 | 6/2014 | Mullaney |
| 2014/0219621 A1 | 8/2014 | Barnette, Jr. et al. |
| 2014/0295700 A1 | 10/2014 | Natoli et al. |
| 2015/0017827 A1 | 1/2015 | Vaccaro |
| 2015/0136439 A1 | 5/2015 | Vaccaro |
| 2015/0268434 A1 | 9/2015 | Barnette, Jr. et al. |
| 2016/0187590 A1 | 6/2016 | Lu |
| 2016/0306122 A1 | 10/2016 | Tong et al. |
| 2016/0349458 A1 | 12/2016 | Murray et al. |
| 2016/0356963 A1 | 12/2016 | Liu et al. |
| 2016/0356964 A1 | 12/2016 | Liu et al. |
| 2017/0131509 A1 | 5/2017 | Xiao et al. |
| 2018/0106972 A1 | 4/2018 | Liu et al. |
| 2018/0224608 A1 | 8/2018 | Liu et al. |
| 2018/0348447 A1 | 12/2018 | Nhep et al. |
| 2020/0088951 A1 | 3/2020 | Liu et al. |

FOREIGN PATENT DOCUMENTS

| | | |
|---|---|---|
| CN | 1333471 A | 1/2002 |
| CN | 1910488 A | 2/2007 |
| CN | 101084460 A | 12/2007 |
| CN | 101084461 A | 12/2007 |
| CN | 101346653 A | 1/2009 |
| CN | 101641627 A | 2/2010 |
| CN | 201527493 U | 7/2010 |
| CN | 201926781 U | 8/2011 |
| CN | 102313934 A | 1/2012 |
| CN | 102360104 A | 2/2012 |
| CN | 102460259 A | 5/2012 |
| CN | 202583527 U | 12/2012 |
| CN | 202815276 U | 3/2013 |
| CN | 202956505 U | 5/2013 |
| CN | 203054267 U | 7/2013 |
| CN | 103353635 A | 10/2013 |
| CN | 103718392 A | 4/2014 |
| CN | 203688854 U | 7/2014 |
| CN | 203786340 U | 8/2014 |
| CN | 203825243 U | 9/2014 |
| CN | 105093420 A | 11/2015 |
| CN | 105093421 A | 11/2015 |
| EP | 0 330 399 A1 | 8/1989 |
| EP | 0 429 398 A2 | 5/1991 |
| EP | 0 740 174 A2 | 10/1996 |
| EP | 2 012 153 A1 | 7/2009 |
| EP | 2 128 675 A1 | 12/2009 |
| EP | 2 355 286 A1 | 8/2011 |
| EP | 2 482 109 A2 | 8/2012 |
| EP | 2 031 719 B1 | 1/2013 |
| GB | 2 509 532 A | 7/2014 |
| JP | 2001-147344 A | 5/2001 |
| JP | 2004-126371 A | 4/2004 |
| JP | 2007-165235 A | 6/2007 |
| JP | 2008-152266 A | 7/2008 |
| JP | 2008-299348 A | 12/2008 |
| WO | 00/13052 A1 | 3/2000 |
| WO | 01/40839 A1 | 6/2001 |
| WO | 02/052310 A2 | 7/2002 |
| WO | 2006/069092 A2 | 6/2006 |
| WO | 2006/069093 A1 | 6/2006 |
| WO | 2008/091720 A1 | 7/2008 |
| WO | WO-2008089416 A2 * | 7/2008 .......... G02B 6/3825 |
| WO | 2008/094365 A1 | 8/2008 |
| WO | 2010/118031 A1 | 10/2010 |
| WO | 2012/037727 A1 | 3/2012 |
| WO | 2012/125836 A2 | 9/2012 |
| WO | 2013/077969 A1 | 5/2013 |
| WO | 2013/126429 A2 | 8/2013 |
| WO | 2017/106507 A1 | 6/2017 |
| WO | 2017/106514 A1 | 6/2017 |

OTHER PUBLICATIONS

International Search Report and Written Opinion for International Application No. PCT/IB2015/050980 mailed Aug. 18, 2015 (11 pages).

Fabricating with XIAMETER® High Consistency Silicon Rubber, Product Guide, Silicones Simplified XIAMETER® from Dow Corning, 50 pages (2009).

(56) References Cited

OTHER PUBLICATIONS

XIAMETER® brand High Consistency Rubber (HCR) Bases—Asia (Excluding Japan) Selection Guide, Silicones Simplified XIAMETER® from Dow Corning, 6 pages (2011).

* cited by examiner

FIBER OPTIC CONNECTOR AND METHOD OF ASSEMBLING THE SAME

CROSS-REFERENCE TO RELATED APPLICATION

This application is a continuation of U.S. patent application Ser. No. 16/883,229, filed on May 26, 2020, now U.S. Pat. No. 11,474,306, which is a continuation of U.S. patent application Ser. No. 15/724,782, filed on Oct. 4, 2017, now U.S. Pat. No. 10,698,166, which is a continuation of U.S. patent application Ser. No. 15/118,926, filed on Aug. 15, 2016, now U.S. Pat. No. 9,829,649, which is a National Stage of PCT/IB2015/050980, filed on Feb. 10, 2015, which claims the benefit of Chinese Patent Application No. 201410052557.X filed on Feb. 14, 2014 in the State Intellectual Property Office of China and which applications are incorporated herein by reference. To the extent appropriate, a claim of priority is made to each of the above disclosed applications.

BACKGROUND OF THE INVENTION

Field of the Invention

The present invention relates to a fiber optic connector and a method of assembling the fiber optic connector.

Description of the Related Art

In prior art, optical cables/fibers generally are optically coupled by following ways of:
1) Splicing Optical Fibers in Field The way of splicing the optical cables/fibers generally comprises steps of: Firstly, processing ends of the optical fibers (including peeling off the optical cable, cleaning and cutting the optical fiber of the optical cable); Secondly, manually or automatically setting optimum splicing parameters of a splicing machine and relative positions of the optical fibers to be spliced based on material and type of the optical fiber; Thirdly, discharging an electric arc with the splicing machine to fuse the ends of the optical fibers, and slowly and linearly pushing the optical fibers toward each other to optically couple the optical fibers; Finally, contracting a heat shrinkable tube on a coupled joint of the optical fibers to protect the coupled joint, and winding the optical fibers to finish all splicing operations in the field. In this case, the splicing properties (including optical attenuation, echo, and long term reliability, etc.) of the optical fibers are in different degrees depended on various factors, such as, operation level of a splicing operator, operation steps, fiber winding level, cleanliness of electrodes of the splicing machine, splicing parameters, cleanliness of working environment, and so on. In addition, it is necessary to use various expensive apparatus, for example, high precision cutting tool, splicing machine or the like, to perform the splicing of the optical fibers in the field.

2) Cold Coupling Optical Fibers

In this solution, two processed optical fibers are fixed in a high precision V-shaped or U-shaped groove and aligned to each other. In addition, an optical matching paste is filled in the V-shaped or U-shaped groove to fill a gap between end surfaces of the two optical fibers. Compared with splicing, the cold coupling is relatively simpler and quicker, because the cold coupling does not need an electric power supply and a heat shrinkable tube to protect the spliced joint. However, the cold coupling is largely depended on cutting quality of the end surfaces of the optical fibers and the optical matching paste. If the cutting quality is poor, it decreases the coupling properties (including optical attenuation, echo, and long term reliability, etc.). Furthermore, as for the cold coupling with the V-shaped or U-shaped groove, the coupling loss is increased with the variation of the temperature. With the passage of time, because of the opened V-shaped or U-shaped groove, flowing away, pollution and aging occurring in the optical matching paste may cause the insertion loss to become larger or even reduce the optical signal to zero. Thereby, the cold coupling has a poor stability and long-term reliability.

3) Assembling Connector in Field

In the way of assembling connector in field, an optical fiber is pre-embedded in a ferrule. At one end of ferrule, an end surface of a standard connector is pre-polished, and at the other end of the ferrule, the pre-embedded fiber is placed in a high precision V-shaped groove with an optical matching paste filled therein. During assembling the connector in the field, the incoming optical fiber/cable is processed in the field (for example, opening the cable, peeling the fiber, cleaning and cutting the fiber), and inserted into the rear end of the connector until the end surface of incoming fiber abuts against the end surface of the pre-embedded fiber in the V-shaped or U-shaped groove, then the fibers are fixed by an external mechanical element. The way of assembling connector in field has a relatively high cost. In addition, it is necessary to use a special tool and an operation guide provided by the connector manufacturer. Also, because the optical matching paste is used, it has a poor stability and long-term reliability.

4) Integral Cable/Fiber Assembly in Factory

The integral cable/fiber assembly is manufactured in the factory. As for this way, it is reliable and is easy to use. However, it cannot be applied in a limited space, for example, in an application of fiber to the home or to the resident, it often needs to pull the cable/fiber assembly through a narrow pipe, especially a pipe in which other cables are paved.

In the above ways in the prior art, there are high requirements on the tool and the operator to assemble the connector in the field. Furthermore, in the prior art, before assembling a ferrule assembly, a spring and a spring seat into the connector housing, the ferrule assembly, the spring and the spring seat are separated from each other and cannot be pre-assembled together. Thereby, in the prior art, the ferrule assembly, the spring and the spring seat must be assembled into the connector housing one by one. Such way of assembling the connector is only adapted to assemble the ferrule assembly, the spring and the spring seat into the connector housing in the factory, and is not adapted to assemble the ferrule assembly, the spring and the spring seat into the connector housing in the field. As a result, the completely assembled connector in the factory cannot be pulled through the narrow pipe in the field, because the completely assembled connector has a large profile size.

SUMMARY OF THE INVENTION

The present invention has been made to overcome or alleviate at least one aspect of the above mentioned disadvantages.

According to an object of the present invention, there is provided a fiber optic connector and a method of assembling the fiber optic connector, wherein a ferrule assembly and a crimping seat are adapted to be pre-assembled to an integral cable assembly having a profile size less than that of a connector housing. In this way, the cable assembly with small profile size may be easily pulled through an elongated pipe in the field. Furthermore, after being pulled through the elongated pipe, the cable assembly as a whole may be quickly assembled into the connector housing in the field.

According to another object of the present invention, there is provided a fiber optic connector and a method of assembling the fiber optic connector, wherein various components of the connector may be correctly and quickly assembled into the connector housing, effectively saving the assembling time and reducing mistake operations.

According to another object of the present invention, there is provided a fiber optic connector and a method of assembling the fiber optic connector, wherein various components of the connector may be pre-assembled to an integral assembly, and an end surface of a ferrule and a fiber are protected to prevent them from damage during assembling the integral assembly into the connector housing, improving the long term reliability of an interconnection of fiber optic connectors.

According to an aspect of the present invention, there is provided a fiber optic connector comprising a housing, a spring, a ferrule assembly and a crimping seat. Before being inserted into the housing, the ferrule assembly is pre-assembled into the crimping seat in a manner of being movable relative to the crimping seat. The spring is pre-assembled into the housing before the ferrule assembly is inserted into the housing. After the pre-assembled ferrule assembly and the crimping seat are inserted into the housing, the crimping seat is snap-fitted in the housing, and the spring pushes the ferrule assembly, so that the ferrule assembly is capable of being moved against the spring relative to the crimping seat.

According to an exemplary embodiment of the present invention, the ferrule assembly comprises: a ferrule; and a ferrule seat with a front end fixedly connected to the ferrule and a rear end fitted in the crimping seat.

According to another exemplary embodiment of the present invention, the ferrule and the ferrule seat are formed into a single piece.

According to another exemplary embodiment of the present invention, a slot is formed in an outer circumferential surface of a front end of the ferrule seat, a retaining member is fitted in the slot through the housing after the ferrule seat is inserted into the housing, and the spring pushes the retaining member, so as to exert an axial elastic force on the ferrule assembly.

According to another exemplary embodiment of the present invention, a spring holding seat and a spring moving block are provided in the housing, and the spring is compressed between the spring holding seat and the spring moving block; and the spring moving block abuts against the retaining member under the push of the spring.

According to another exemplary embodiment of the present invention, a protrusion is formed on a front end portion of the crimping seat, and the protrusion is snapped into a recess formed in the spring holding seat.

According to another exemplary embodiment of the present invention, an insertion opening is formed in the housing, and the retaining member is inserted into the slot of the ferrule seat through the insertion opening after the ferrule assembly is inserted into the housing.

According to another exemplary embodiment of the present invention, the crimping seat has an insertion chamber defined by a plurality of petal shaped parts, and the rear end of the ferrule seat is inserted into the insertion chamber of the crimping seat.

According to another exemplary embodiment of the present invention, the fiber optic connector further comprises: a crimp ring configured to crimp a strengthening element of an optical cable on a rear end of the crimping seat; and a stress relief tube configured to be sleeved on the crimp ring crimped on the rear end of the crimping seat.

According to another exemplary embodiment of the present invention, the fiber optic connector further comprises: a dust cap fitted on the front end of the ferrule.

According to another exemplary embodiment of the present invention, the optical cable, the dust cap, the ferrule assembly, the spring seat, the crimp ring and the stress relief tube are pre-assembled together to form a cable connection assembly as a whole before being inserted into the housing; the spring, the spring moving block and the spring holding seat are pre-assembled in the housing before the cable connection assembly is inserted into the housing; and the protrusion of the crimping seat is snapped into the recess of the spring holding seat after the cable connection assembly is inserted into the housing, so as to limit the cable connection assembly in the housing.

According to another aspect of the present invention, there is provided a method of assembling a fiber optic connector, comprising steps of:

pre-assembling an optical cable, a dust cap, a ferrule assembly, a crimping seat, a crimp ring and a stress relief tube together to form a cable connection assembly as a whole;

pre-assembling a spring, a spring moving block and a spring holding seat in a housing of the fiber optic connector before the cable connection assembly is inserted into the housing; and inserting the cable connection assembly as a whole into the housing in which the spring, the spring moving block and the spring holding seat have been pre-assembled.

The ferrule assembly is pre-assembled into the crimping seat in a manner of being movable relative to the crimping seat. After the cable connection assembly is inserted into the housing, the crimping seat is snapped in the spring holding seat, so as to limit the cable connection assembly in the housing. After the cable connection assembly is inserted into the housing, the spring pushes the ferrule assembly, so that the ferrule assembly is capable of being moved against the spring relative to the crimping seat.

According to an exemplary embodiment of the present invention, the above method further comprises a step of: pulling the cable connection assembly through an elongated pipe before inserting the cable connection assembly into the housing.

According to another exemplary embodiment of the present invention, the ferrule assembly comprises a ferrule, and a ferrule seat with a front end fixedly connected to the ferrule and a rear end fitted in the crimping seat.

According to another exemplary embodiment of the present invention, a slot is formed in an outer circumferential surface of a front end of the ferrule seat, and a retaining member is fitted in the slot after the ferrule seat is inserted into the housing, so as to block the ferrule seat from being moved out of the housing under the push of the spring.

According to another exemplary embodiment of the present invention, the spring is compressed between the spring moving block and the spring holding seat; and the spring moving block abuts against the retaining member under the push of the spring.

According to another exemplary embodiment of the present invention, a protrusion is formed on a front end portion of the crimping seat, and the protrusion is snapped into a recess formed in the spring holding seat after the crimping seat is inserted into the housing.

According to another exemplary embodiment of the present invention, an insertion opening is formed in the housing, and the retaining member is inserted into the slot of the ferrule seat through the insertion opening after the ferrule assembly is inserted into the housing.

According to another exemplary embodiment of the present invention, the crimping seat has an insertion chamber defined by a plurality of petal shaped parts, and the rear end of the ferrule seat is inserted into the insertion chamber of the crimping seat.

According to another exemplary embodiment of the present invention, the crimp ring is configured to crimp a strengthening element of the optical cable on a rear end of the crimping seat; and the stress relief tube is configured to be sleeved on the crimp ring crimped on the rear end of the crimping seat.

In the fiber optic connector and the method of assembling the fiber optic connector according to the above exemplary embodiments of the present invention, before being inserted into a housing of the fiber optic connector, some components, including the ferrule assembly and the crimping seat, of the connector may be pre-assembled together to form an integral assembly having a size less than that of a housing of the fiber optic connector. Accordingly, the integral assembly may be smoothly pulled through a small long pipe. Furthermore, after being pulled through the pipe, the integral assembly may be easily and quickly inserted into the housing as a whole at one time, saving the assembly time, avoiding mistake operations, effectively preventing the warp of the spring, protecting the end surface of the ferrule and the fiber from being damaged during the assembling process, and increasing the long term reliability of the interconnection of the fiber optic connectors.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
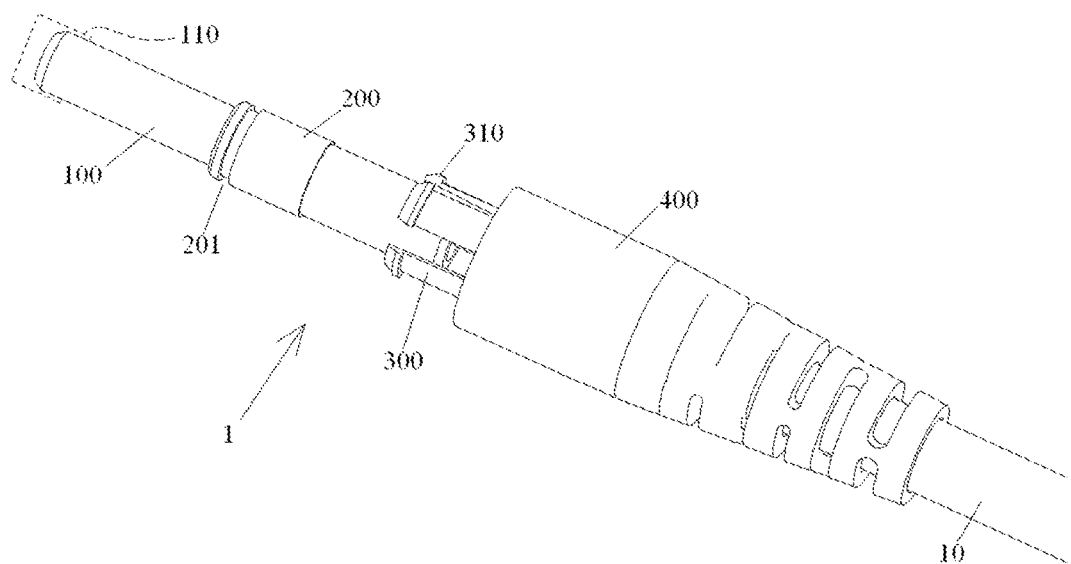
FIG. 1 is an illustrative perspective view of a cable connection assembly formed by assembling some components, including a ferrule assembly and a crimping seat, of a fiber optic connector according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present invention, there is provided a fiber optic connector comprising a housing, a spring, a ferrule assembly and a crimping seat. Before being inserted into the housing, the ferrule assembly is pre-assembled into the crimping seat in a manner of being movable relative to the crimping seat. The spring is pre-assembled into the housing before the ferrule assembly is inserted into the housing. After the pre-assembled ferrule assembly and crimping seat are inserted into the housing, the crimping seat is snapped in the housing, and the spring pushes the ferrule assembly, so that the ferrule assembly is capable of being moved against the spring relative to the crimping seat.

FIG. 1 is an illustrative perspective view of a cable connection assembly formed by assembling some components, including a ferrule assembly, a crimping seat, and so on, of a fiber optic connector according to an exemplary embodiment of the present invention.

In an exemplary embodiment, as shown in FIG. 1, the cable connection assembly 1 mainly comprises a ferrule assembly, a crimping seat 300 and an optical cable 10. In another exemplary embodiment, the cable connection assembly 1 may further comprise a crimp ring 410 (FIG. 6), a stress relief tube 400, and a dust cap 110.

Figure 5:
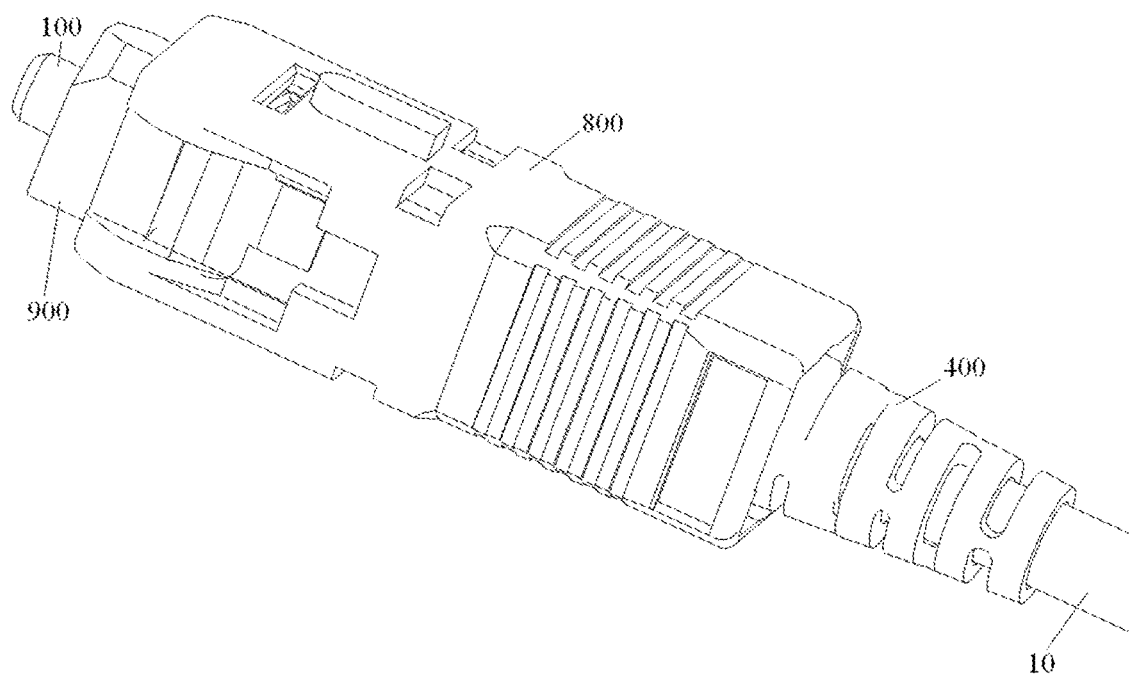
FIG. 5 is an illustrative perspective view of a complete fiber optic connector after the cable connection assembly of FIG. 1 is inserted into the housing in which the spring has been pre-assembled.
Figure 6:
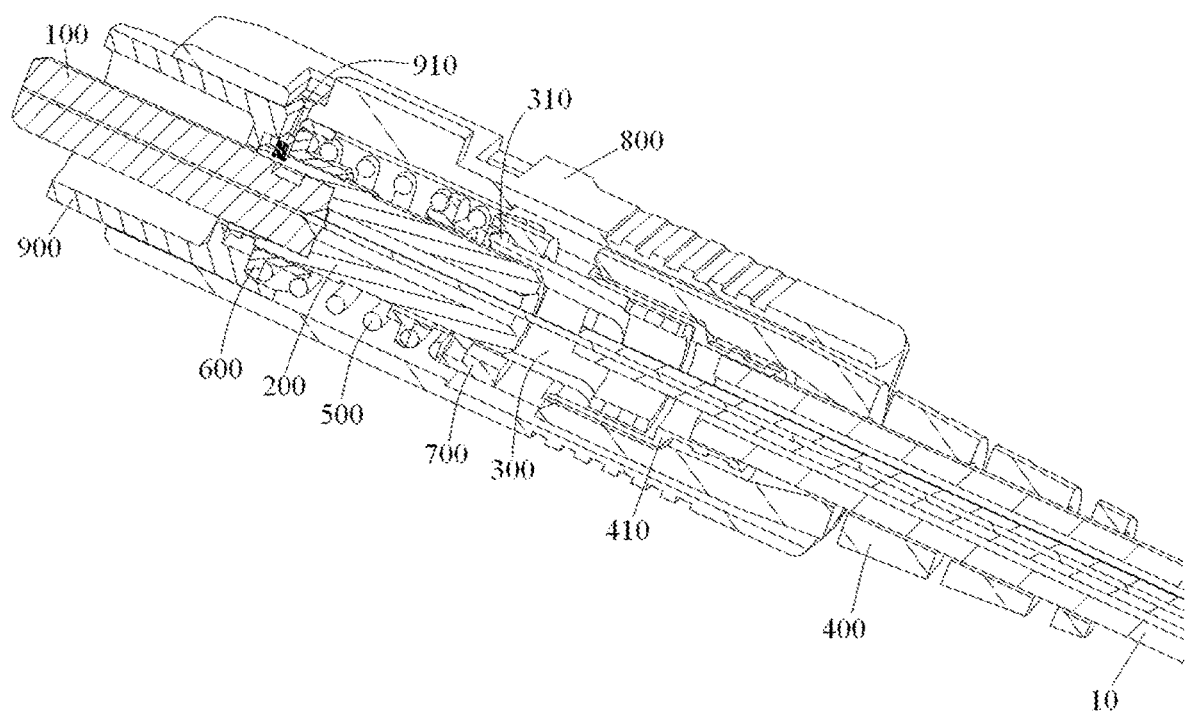
FIG. 6 is an illustrative cross section view of the fiber optic connector of FIG. 5.

FIG. 5 is an illustrative perspective view of a complete fiber optic connector after the cable connection assembly 1 of FIG. 1 is inserted into the housing in which a spring 500 has been pre-assembled; and FIG. 6 is an illustrative cross section view of the fiber optic connector of FIG. 5.

As shown in FIGS. 1, 5-6, the ferrule assembly comprises: a ferrule (100); and a ferrule seat (200) with a front end (left end or distal end in the FIGS.) fixedly connected to a rear end of the ferrule (100) and a rear end (right end or approximate end in the FIGS.) fitted in the crimping seat (300). In an alternative embodiment, the ferrule 100 and the ferrule seat 200 may be formed into a single piece. A fiber of the optical cable 10 is inserted into and fixed in a bore of the ferrule 100. In the illustrated embodiment, the ferrule 100, the ferrule seat 200 and the optical cable 10 may be together regarded as the ferrule assembly.

Referring to FIGS. 1 and 6, the dust cap (indicated by dash line in FIG. 1) 110 is fitted on a front end of the ferrule 100, so as to protect the front end surface of the ferrule 100 and a fiber of the optical cable 10 from being damaged during assembling the pre-assembled cable connection assembly 1 into the connector housing.

As shown in FIGS. 1 and 6, the crimping seat 300 has an insertion chamber defined by a plurality of petal shaped parts, and a rear end of the ferrule seat 200 is inserted into the insertion chamber of the crimping seat 300 and movable forward and backward relative to the crimping seat 300 in the insertion chamber of the crimping seat 300.

As shown in FIGS. 1 and 6, the crimp ring 410 is constructed to crimp a strengthening element of the optical cable 10 on a rear end of the crimping seat 300, and the stress relief tube 400 is sleeved on the crimp ring 410 crimped on the rear end of the crimping seat 300.

Figure 2:
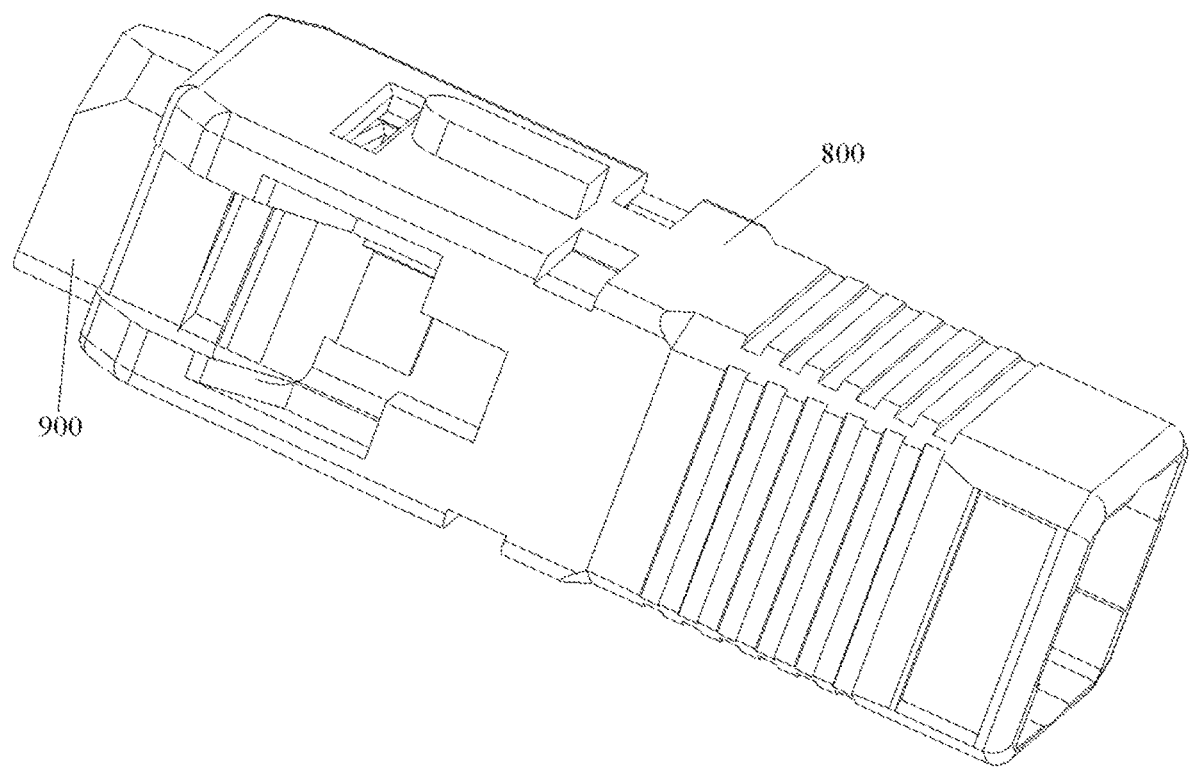
FIG. 2 is an illustrative perspective view of a housing of a fiber optic connector according to an exemplary embodiment of the present invention, wherein a spring is pre-assembled in the housing.
Figure 3:
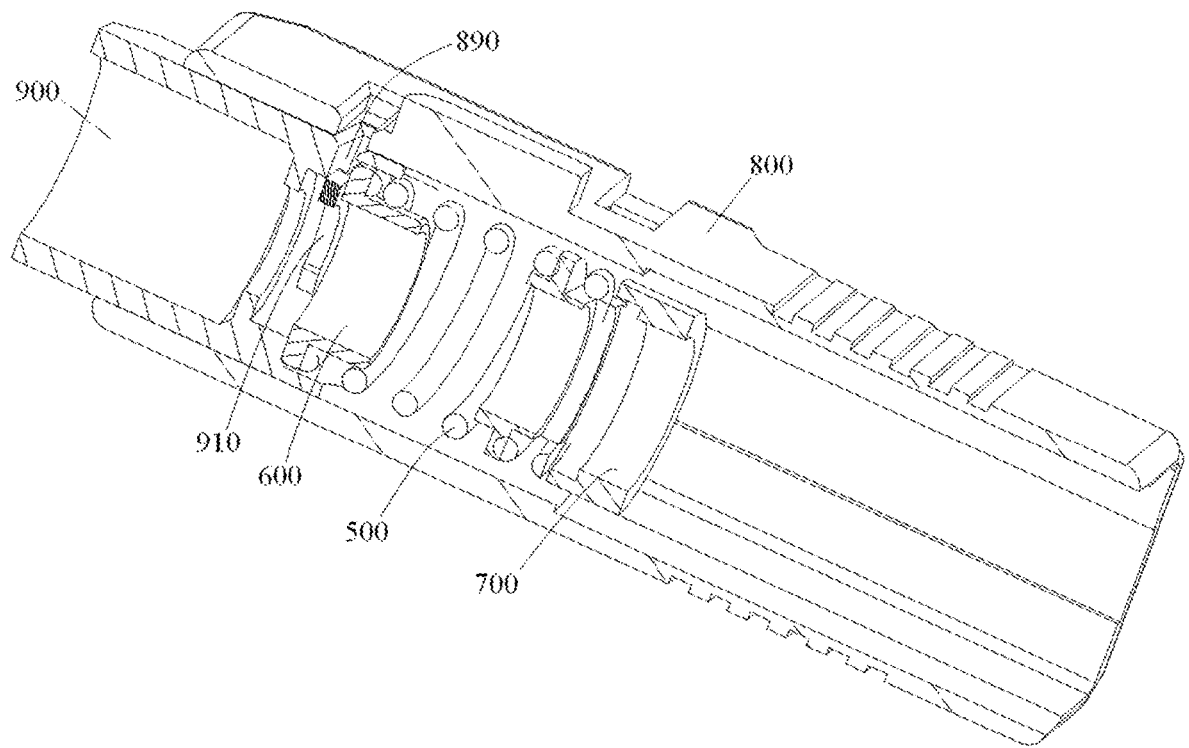
FIG. 3 is an illustrative cross section view of the housing of the fiber optic connector shown in FIG. 2.

FIG. 2 is an illustrative perspective view of housings 800, 900 of a fiber optic connector according to an exemplary embodiment of the present invention, wherein a spring 500 is pre-assembled in the housings 800, 900; FIG. 3 is an illustrative cross section view of the housings 800, 900 of the fiber optic connector shown in FIG. 2.

As shown in FIGS. 2-3, the fiber optic connector comprises an outer housing 800 and an inner housing 900 adapted to be fitted in the outer housing 800.

As shown in FIGS. 2-3 and 6, a spring holding seat 700 and a spring moving block 600 are provided in the inner housing 900, and the spring 500 is compressed between the spring holding seat 700 and the spring moving block 600.

Figure 4:
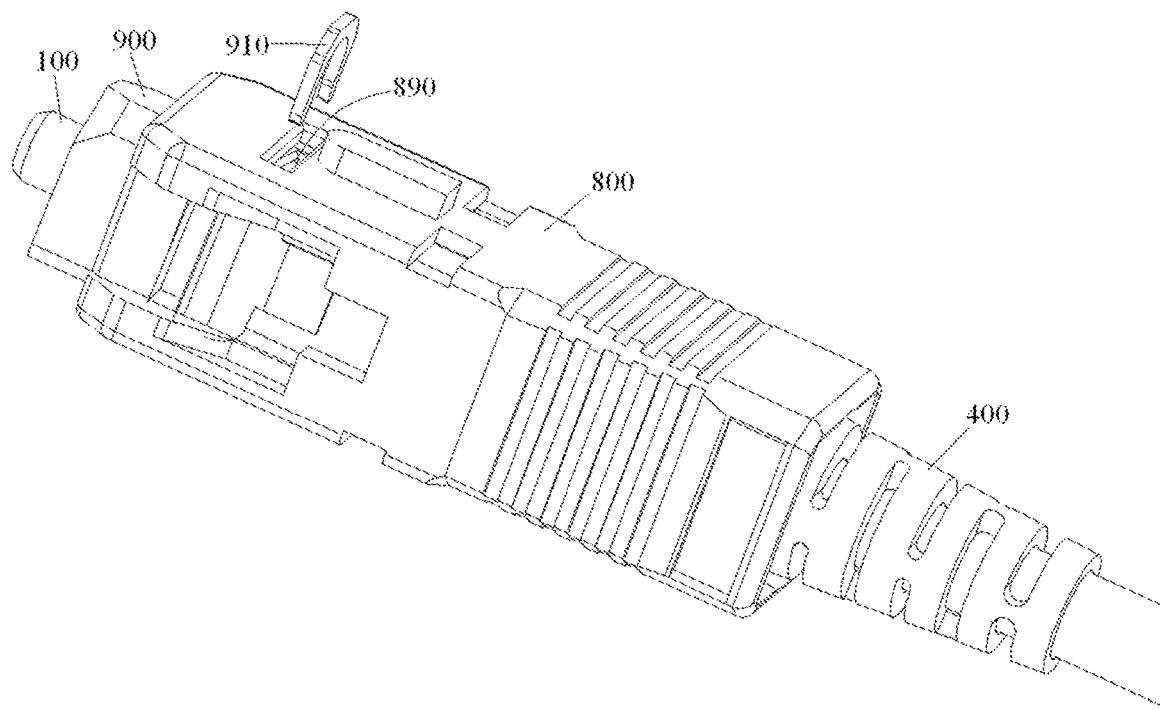
FIG. 4 is an illustrative view of inserting the cable connection assembly of FIG. 1 into the housing in which the spring has been pre-assembled.

FIG. 4 is an illustrative view of inserting the cable connection assembly 1 of FIG. 1 into the housings 800, 900 in which the spring 500 has been pre-assembled.

As shown in FIGS. 1-6, a slot 201 is formed in an outer circumferential surface of a front end of the ferrule seat 200. After the ferrule seat 200 is inserted into the housings 800, 900, a retaining member 910 is fitted in the slot 201 through the outer housing 800. The spring 500 pushes the retaining member 910, so as to exert an axial elastic force on the ferrule assembly.

As shown in FIG. 6, the spring moving block 600 abuts against the retaining member 910 under the push of the spring 500. In this way, the spring 500 is provided to push the ferrule assembly, so that the ferrule assembly is capable of being moved against the spring 500 relative to the crimping seat 300.

As shown in FIGS. 1-6, a protrusion 310 is formed on a front end (distal end) portion of the crimping seat 300, and the protrusion 310 is snapped into a recess formed in the spring holding seat 700 after the crimping seat 300 is inserted into the connector housing.

As shown in FIG. 4, an insertion opening 890 is formed in the outer housing 800 of the fiber optic connector, and the retaining member 910 is inserted into the slot 201 of the ferrule seat 200 through the insertion opening 890 after the cable connection assembly 1 is inserted into the housings 800, 900.

In an exemplary embodiment, as shown in FIGS. 1-6, the optical cable 10, the dust cap 110, the ferrule assembly, the spring seat 300, the crimp ring 410 and the stress relief tube 400 are pre-assembled together to form a cable connection assembly 1 as a whole before being inserted into the connector housing. The spring 500, the spring moving block 600 and the spring holding seat 700 are pre-assembled in the housing before the cable connection assembly 1 is inserted into the connector housing. The protrusion 310 of the crimping seat 300 is snapped into the recess of the spring holding seat 700 after the cable connection assembly 1 is inserted into the housing, so as to limit the cable connection assembly 1 in the housing. In this way, a complete fiber optic connector is obtained.

According to another exemplary embodiment of the present invention, there is also disclosed a method of assembling a fiber optic connector, comprising steps of:

pre-assembling an optical cable 10, a dust cap 110, a ferrule assembly, a crimping seat 300, a crimp ring 410 and a stress relief tube 400 together to form a cable connection assembly 1 as a whole; and pre-assembling a spring 500, a spring moving block 600 and a spring holding seat 700 in a housing of the connector before the cable connection assembly 1 is inserted into the housing; and inserting the cable connection assembly 1 as a whole into the housing in which the spring 500, the spring moving block 600 and the spring holding seat 700 have been pre-assembled, then snap-fitting a protrusion 310 of the crimping seat 300 into a recess of the spring holding seat 700 after the cable connection assembly 1 being inserted into the housing, so as to limit the cable connection assembly 1 in the housing.

In the above method, the ferrule assembly is pre-assembled into the crimping seat 300 in a manner of being movable relative to the crimping seat 300, as shown in FIG. 1.

In the above method, after the cable connection assembly 1 is inserted into the housing, as shown in FIG. 6, the crimping seat 300 is snap-fitted in the spring holding seat 700, so as to limit the cable connection assembly 1 in the housing.

In the above method, after the cable connection assembly 1 is inserted into the housing, as shown in FIG. 6, the spring 500 pushes the ferrule assembly, so that the ferrule assembly is capable of being moved against the spring 500 relative to the crimping seat 300.

In an exemplary embodiment, the above method further comprises a step of: pulling the cable connection assembly 1 through an elongated pipe before inserting the cable connection assembly 1 into the connector housing.

Although the housing, in the illustrated embodiment, comprises the outer housing 800 and the inner housing 900 fitted in the outer housing 800, the present invention is not limited to this, the housing may comprise a single housing.

In the fiber optic connector and the method of assembling the fiber optic connector according to the above exemplary embodiments of the present invention, before being inserted into the connector housing, some components, including the ferrule assembly and the crimping seat, of the connector may be pre-assembled together to form an integral assembly having a size less than that of the housings of the fiber optic connector. Accordingly, the integral assembly with small size may be smoothly pulled through a small long pipe. Furthermore, after being pulled through the pipe, the integral assembly may be easily and quickly inserted into the housing as a whole at one time, saving the assembly time, avoiding mistake operations, effectively preventing the warp of the spring, protecting the end surface of the ferrule and the fiber from being damaged during the assembling process, and increasing the long term reliability of the interconnection of the fiber optic connectors.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A method of assembling a fiber optic connector, comprising steps of:
   (a) assembling an optical cable, a ferrule assembly and a stress relief tube to form a cable connection assembly, the cable connection assembly not including a spring;
   (b) subsequent to (a), moving the cable connection assembly through an elongated pipe;
   (c) subsequent to (b), inserting the cable connection assembly into an inner housing; and
   (d) subsequent to (c), inserting the inner housing into an outer housing such that a portion of the stress relief tube is positioned in an interior of the outer housing and another portion of the stress relief tube is positioned exterior to the outer housing.

2. The method of claim 1, further comprising, prior to (c), assembling a spring in the inner housing.

3. The method of claim 2, wherein assembling the spring in the inner housing includes:
   inserting a spring moving block into the inner housing,
   wherein the spring is compressed between the spring moving block and a spring holding seat.

4. The method of claim 2,
   wherein the cable connection assembly includes a crimping seat; and
   wherein subsequent to (d), the spring pushes the ferrule assembly, so that the ferrule assembly is capable of being moved against the spring relative to the crimping seat.

5. The method of claim 4, wherein the ferrule assembly comprises:
   a ferrule; and
   a ferrule seat with a front end fixedly connected to the ferrule and a rear end fitted in the crimping seat.

6. The method of claim 5,
   wherein the ferrule seat includes an outer circumferential slot; and wherein the method further comprises:
   (e) subsequent to (d), fitting a retaining member in the slot through the inner housing and the outer housing so as to block the ferrule seat from being moved out of the inner housing under the push of the spring.

7. The method of claim 6, wherein the outer housing includes an insertion opening, and wherein the retaining member is inserted through the insertion opening into the slot.

8. The method of claim 5,
   wherein a front end portion of the crimping seat includes a protrusion; and
   wherein the method further comprises:
   (e) subsequent to (d), snap-fitting the protrusion into a recess of the spring holding seat.

9. The method of claim 5,
   wherein the crimping seat includes an insertion chamber defined by a plurality of petal shaped parts; and
   wherein the step (a) includes inserting a rear end of the ferrule seat in the insertion chamber of the crimping seat.

10. The method of claim 5,
    wherein the step (a) includes crimping a crimp ring to a strengthening element of the optical cable on a rear end of the crimping seat.

11. The method of claim 10, wherein the step (a) includes sleeving the stress relief tube onto the crimp ring.

12. The method of claim 10, further comprising:
    (e) prior to (d), sleeving the stress relief tube onto the crimp ring.

13. The method of claim 1, wherein the moving includes pulling.

14. The method of claim 1, wherein the step (a) includes installing a dust cap on a ferrule of the ferrule assembly to form the cable connection assembly.

15. The method of claim 1, wherein the ferrule assembly includes a ferrule and a ferrule seat.

* * * * *